United States Patent [19]

Araki

[11] Patent Number: 4,868,368

[45] Date of Patent: Sep. 19, 1989

[54] HEATED ROLLER TEMPERATURE CONTROL SYSTEM

[75] Inventor: Kazuhiro Araki, Toyokawa, Japan

[73] Assignee: Minolta Camera Kabushiki Kaisha, Osaka, Japan

[21] Appl. No.: 315,198

[22] Filed: Feb. 24, 1989

Related U.S. Application Data

[63] Continuation of Ser. No. 875,060, Jun. 17, 1986, abandoned.

[30] Foreign Application Priority Data

Jun. 18, 1985 [JP] Japan ................ 60-132443

[51] Int. Cl.$^4$ .............................. H05B 1/02
[52] U.S. Cl. .................... 219/216; 219/497; 219/494; 340/589
[58] Field of Search ........... 219/216, 469-471, 219/490, 491, 494, 492, 497, 501, 505, 507, 508; 340/588, 589; 307/117

[56] References Cited

U.S. PATENT DOCUMENTS

| 4,316,179 | 2/1982 | Bliss et al. ................. 340/589 |
| 4,337,388 | 6/1982 | July ........................ 219/497 |
| 4,362,924 | 12/1982 | Story et al. ................ 219/497 |
| 4,374,321 | 2/1983 | Cunningham Jr. et al. ...... 219/497 |
| 4,415,800 | 11/1983 | Dodge et al. ............... 219/497 |
| 4,461,951 | 7/1984 | Lvoma, II et al. ........... 219/497 |
| 4,496,829 | 1/1985 | Black et al. ............... 219/497 |
| 4,524,264 | 6/1985 | Takeuchi et al. ............ 219/497 |
| 4,551,007 | 11/1985 | Elter ...................... 219/497 |

FOREIGN PATENT DOCUMENTS 59-68769  4/1984  Japan.
60-22168  2/1985  Japan.

Primary Examiner—M. H. Paschall
Attorney, Agent, or Firm—Burns, Doane, Swecker & Mathis

[57] ABSTRACT

An automatic temperature control system for a heated roller constituting a fixing device. This control system has functions to sense the surface temperature of the heated roller, to compare with the sensed temperature and a target temperature suited for fixing toner image on a paper, and to determine a temperature gradient or a rate of temperature change with respect to time lapse of the heated roller, whereby a heater for heating the heated roller is turned on and off in accordance with the temperature state based on the comparison and the temperature gradient, that is whether the temperature of the heated roller is rising or falling. This temperature control for the heated roller is repeated on the basis of the surface temperature of the heated roller sampled by the system at fixed intervals.

7 Claims, 4 Drawing Sheets

HEATED ROLLER TEMPERATURE CONTROL SYSTEM

This application is a continuation of application Ser. No. 875,060, filed June 17, 1986 now abandoned.

BACKGROUND OF THE INVENTION

1. Field of the Invention

The present invention relates to an automatic temperature control system for a heated roller of a fixing device mounted in a copying machine, a microfilm printer or the like. More specifically, the present invention relates to an automatic temperature control method and an apparatus therefor which provide the supply of a control signal to control a heater for heating the heated roller, the on/off control signal being related to a comparative valve between a redetermined temperature and a sensed temperature.

2. Description of the Prior Art

Generally, a conventional temperature control system of this type effects controls in response to a signal provided by a comparator to switch off the heater when the surface temperature of the heated roller exceeds a predetermined temperature and switch on the heater when the surface temperature falls below the predetermined temperature.

In recent years, however, use of a small heated roller having a small heat capacity or a large capacity heater has been proposed in order to shorten the warming-up time. But this in turn not only causes increase a unit time temperature rise when the heater is switched on but also to cause sharp temperature drop with passage of copy paper. On the other hand, a temperature detecting device such as a thermister itself has some heat capacity which causes a time lag between its detection of a temperature change and its corresponding output. With the conventional temperature control system, such a time lag occurs in the because of rapid temperature changes, which widens the difference between a detected temperature and an actual temperature. As a result, temperature ripples with respect to the predetermined temperature become large. In that situation the conventional control system is not only incapable of high precision temperature control but has the drawback of damaging the heated roller with the enlarged temperature ripples.

SUMMARY OF THE INVENTION

Having regard to the above-noted disadvantage of the prior art, the object of the present invention is to provide a temperature control system capable, in spite of a shortened warming-up time, of high precision temperature control with minimized temperature ripples with respect to a predetermined temperature and of safeguarding the heated roller against damage due to the temperature ripples.

According to the invention there is provided a method of controlling temperature of a heated roller included in a fixing device. This method comprises the steps of sensing an actual temperature of the heated roller, determining a sign, high or low, of a temperature state based on the comparison between the predetermined temperature and the sensed temperature, determining a sign, ascent or descent, of a temperature gradient of the heated roller, controlling the power supply to the heater according to the sign of the temperature gradient and the sign of the temperature state, and repeating the above steps automatically to control the power supply to the heater, thereby automatically to adjust the temperature of the heated roller to the predetermined temperature.

Further, according to the invention there is provided an apparatus for automatically controlling temperature of a heated roller included in a fixing device. This apparatus comprises sensing means for sensing an actual temperature of the heated roller, heating means for heating the heated roller, and multifunction electrical circuit means coupled to the sensing means and the heating means for determining a sign, high or low, of the temperature state based on the comparison based on the sensed temperature and the predetermined temperature, for determining a sign, ascent or descent, of a temperature gradient of the heated roller, for controlling the heating means according to the sign of the temperature gradient and the temperature state, and for repeating the above steps automatically to control the heating means, thereby automatically to adjust the temperature of the heated roller to the predetermined temperature.

Thus, the control system according to the present invention controls the heater or heating means not merely by comparing the sensed surface temperature of the heated roller with the predetermined temperature, but by taking the temperature gradient of the heated roller into account also. This system is capable of effecting controls with improved precision and of minimizing the temperature ripples.

Other advantages of the present invention will be apparent from the following description.

Brief Description of the Drawings

The drawings illustrate a temperature control system for a fixing device according to the present invention, in which.

DESCRIPTION OF THE PREFERRED EMBODIMENT

Figure 2:
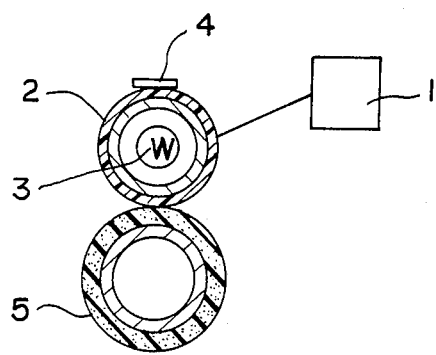
FIG. 2 is a schematic section of the fixing device.

An embodiment of the invention will be described hereinafter with reference to the drawings. Referring first to FIG. 2, a fixing device mounted in a copying machine, not shown, comprises a heated roller 2 driven by a motor 1 and including a heater 3, and a temperature sensor 4 consisting of a thermister for detecting a surface temperature of the heated roller 2. The fixing device further comprises a pressure roller 5 in pressure contact with the heated roller 2 to be rotatable with the heated roller 2. Toner on copy paper is heated while the copy paper advances between the two rollers 2 and 5 whereby the toner is fixed to the copy paper.

Figure 1:
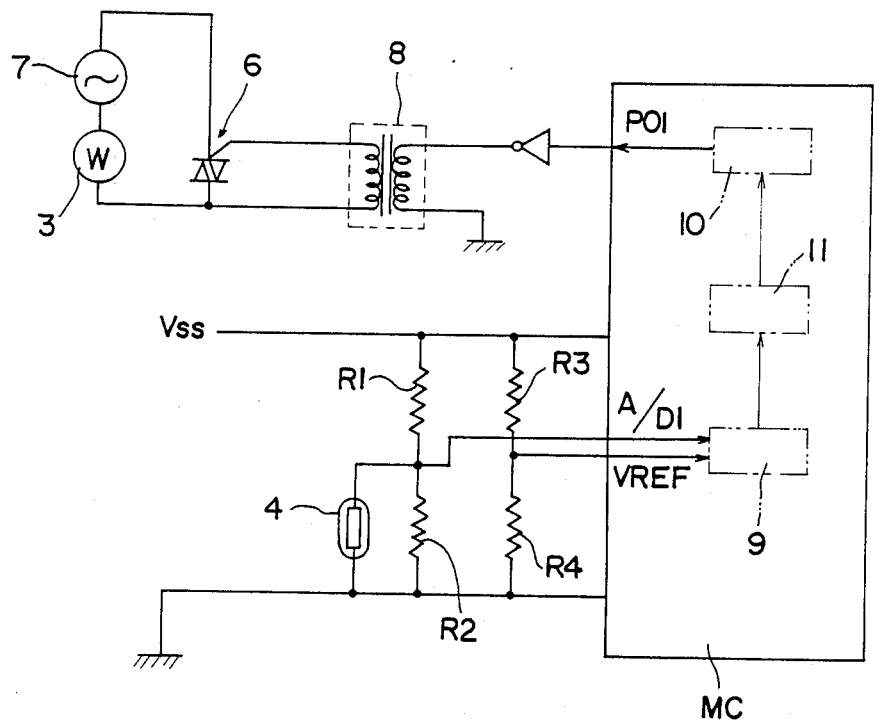
FIG. 1 is a diagram of a temperature control circuitry.

FIG. 1 shows a control circuitry for the heater 3. The heater 3 is connected to an AC source 7 through a triac 6. The triac 6 is triggered through a transformer 8 by a signal sent from an output port PO1 of a microcomputer MC having an A/D converter therein. The temperature sensor 4 comprising a thermister is in parallel connection with a resistance R2 and in series connection with a resistance R1 to divide a voltage Vss. A voltage signal corresponding to a resistance variation of the temperature sensor 4 is input to an input port A/D1 of the microcomputer MC and is digitalized in the microcomputer MC. A voltage that serves as the reference for this A/D conversion is produce by resistances R3 and R4 and is input to an input port $V_{REF}$ of the microcomputer MC.

Figure 3:
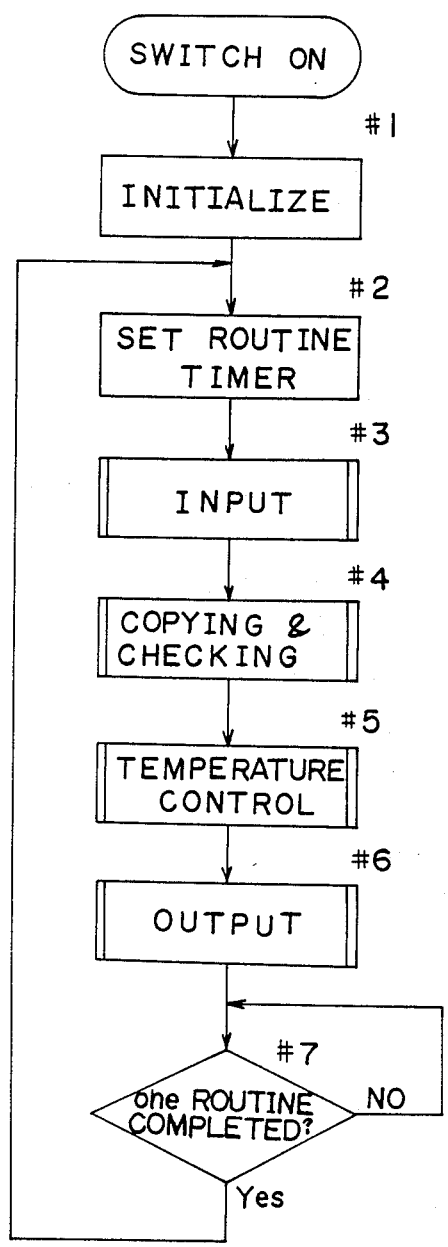
FIGS. 3 and 4 are flowcharts of a temperature control operation.
Figure 4:
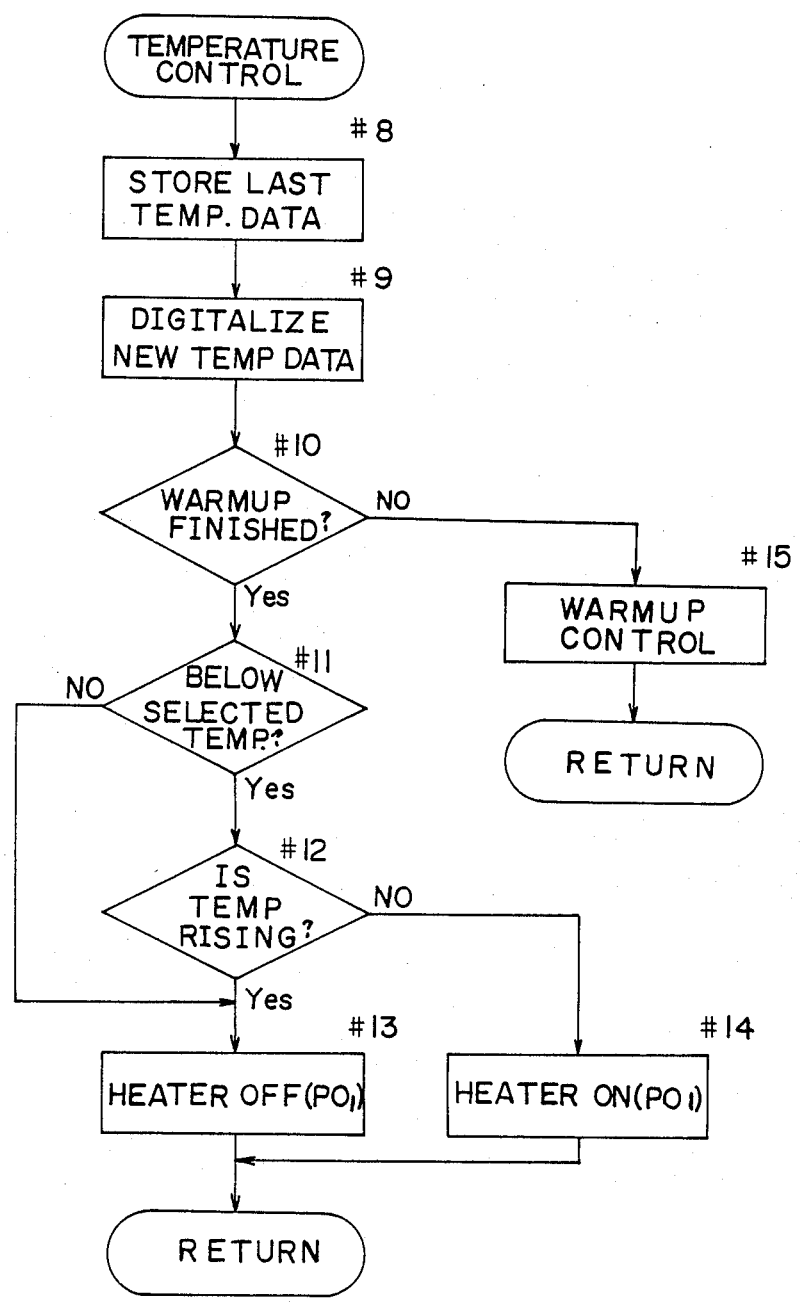

The temperature control effected by the microcomputer MC will be described next with reference to the flowcharts of FIGS. 3 and 4. When the power supply to the copying machine is switched on, the microcomputer MC is initialized (#1) and a routine timer is set to determine a time for performing the programmed sequence (#2). Thereafter inputs are made from switches and sensors not shown (#3), controls and operations for copying and trouble checking are carried out (#4), and then all temperature control steps are taken (#5). Details of the steps taken at #5 are numbered #8 to #15. After outputting results of the steps so far taken (#6) the program waits for the routine timer to finish clocking (#7) and, upon completion of one routine, returns to #2 to repeat the steps #2–#7. In this embodiment one routine is completed in 32 msec.

In the temperature control steps taken at #5, first of all, an input from the temperature sensor 4 received and digitalized the last time is stored away into the internal RAM of microcomputer MC (#8), and then an input received from the temperature sensor 4 this time is digitalized (#9). Thereafter, at step #10 judgment is made whether warming-up is finished or not, that is judgment is made on the basis of the data resulting from the A/D conversion of the received input at #9 whether the surface temperature T2 of the heated roller 2 has reached a warming-up completion temperature Tw or not. If the warming-up is completed, the program moves to #11. At step #11 the currently detected surface temperature T2 is compared with a predetermined temperature Ts by a comparator 9. If the comparison shows that the surface temperature T2 has reached the selected temperature Ts, the heater 3 is switched of by a signal from a heater controller 10 (#13) and the program finishes the temperature control steps and moves to #6. If conversely the surface temperature T2 is below the selected temperature Ts, judgment is made at step #12 whether the current surface temperature T2 is higher than a previously detected surface temperature T1 or not, namely whether the temperature gradient of the heated roller 2 is rising or falling, by a temperature gradient detector 11 which compares the data stored away into the RAM at step #8 and the data digitalized at step #9. If the gradient is rising, the heater 3 is switched off (#13). If the gradient is level or falling, the heater 3 is switched on (#14) and the program moves to step #6. When the warming-up is found unfinished at step #10, the heater 3 is switched on at step #15 for warming-up control prior to return to step #6. It is to be noted that the warming-up completion temperature Tw is set below the selected temperature Ts.

Figure 5:
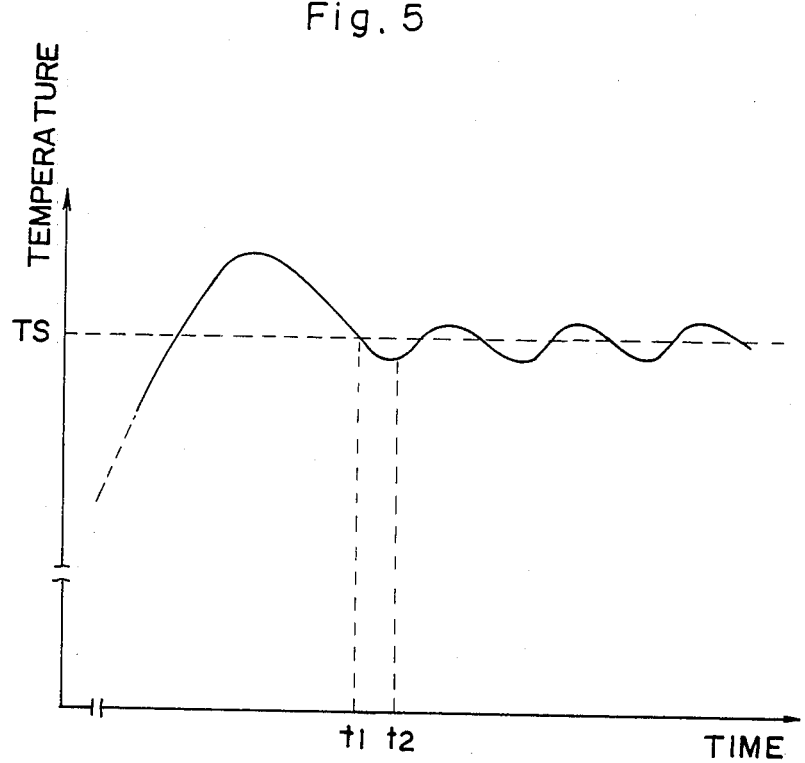
FIG. 5 is a graph showing a temperature control mode.

The described control sequence controls the temperature of the heated roller 2 as shown in FIG. 5. When the heater 3 is switched off upon completion of the warming-up control, the temperature rises by a degree corresponding to an overshoot. Then the temperature starts falling and reaches the predetermined temperature Ts at a certain point of time $t_1$ from which the temperature still keeps falling. On the other hand, the microcomputer MC is receiving the voltage signal at fixed intervals at the input port A/D1 from the temperature sensor 4, digitalizing the signal and monitoring its voltage level and gradient. Thus, the microcomputer MC detects the temperature of the heated roller 2 to be below the selected temperature Ts a little after the time $t_1$ and to be still falling. Then a heater drive signal is output from the output port PO1 of the microcomputer MC and this signal is maintained until the temperature sensor 4 detects a rise of the temperature, namely until a time $t_2$ when the input voltage at the input port A/D1 starts falling. As a result, the temperature of the heated roller 2 rises to a degree slightly above the selected temperature Ts owing to the heat remaining of the heated roller 2, and then starts falling again. The temperature of the heated roller 2 is controlled similarly thereafter to be maintained close to the predetermined temperature Ts with high precision and entailing only slight temperature ripples.

Thus, the control system according to the present invention controls supplying the power to the heater not merely by comparing the sensed surface temperature of the heated roller with the predetermined temperature, but by taking the temperature gradient of the heated roller into account also, such that the heater is switched on when the surface temperature of the heated roller is below the predetermined temperature and the temperature gradient is falling. Therefore, this system is capable of effecting controls with improved precision and of minimizing the temperature ripples.

While in the described embodiment the heater 3 is switched on when the temperature of the heated roller 2 is below the predetermined temperature Ts and the temperature gradient is falling, the heater 3 may be switched on when the temperature of the heated roller 2 is below the predetermined temperature Ts and the temperature gradient is falling or level.

Further, in the described embodiment the detection is carried out every routine, or every 32 msec., to find out whether the surface temperature of the heated roller 2 is rising or falling, but the detection may be carried out every other routine or once in five routines. The detection may be carried out on the basis of an external timer. The present invention is applicable also to a fixing device controllable by phase control and not by cutting off the power for the heater 3.

What is claimed is:
1. A method of controlling the temperature of a roller heated by a heater and included in a fixing device, comprising the steps of:
  sensing an actual temperature of the heated roller;
  determining a sign, high or lower, of a temperature state based on the comparison between a predetermined temperature and the sensed temperature;
  determining a sign, ascent or descent, of a temperature gradient of the heated roller;
  controlling a power supply to the heater, which includes turning on the power supply to the heater in response to the sign of the temperature state being "low" and the sign of temperature gradient being "descent" and inhibiting the power supply to the heater in response to the sign of the temperature state being "low" and the sign of temperature gradient being "ascent" and also inhibiting the power supply whenever the sign of the temperature state is "high"; and
  repeating the above steps automatically to control the power supply to the heater, thereby automatically adjusting the temperature of the heated roller to the predetermined temperature.

2. A method according to claim 1, wherein said step of sensing an actual temperature of the heated roller includes sensing an actual temperature of the heated roller periodically and storing the last actual temperature previously sensed.

3. A method according to claim 2, wherein said step of determining a sign of a temperature gradient of the heated roller includes determining a sign, ascent or descent, from the last actual temperature previously sensed and an actual temperature of the heated roller presently sensed.

4. An apparatus for controlling the temperature of a heated roller included in a fixing device, comprising:
   means for heating the roller;
   sensing means for sensing an actual temperature of the heated roller;
   first determination means for determining a sign, high or low, of a temperature state based on the comparison between a predetermined temperature and the sensed temperature;
   second determination means for determining a sign, ascent or descent, of a temperature gradient of the heated roller based on the sensed temperature; and
   control means for supplying a power to the heating means in response to the sign of the temperature state being "low" and the sign of the temperature gradient being "descent" and for inhibiting the power supply to the heating means in response to the sign of the temperature state being "low" and the sign of the temperature gradient being "ascent" and also inhibiting the power supply whenever the sign of the temperature state is "high".

5. An apparatus according to claim 4, wherein said second determination means includes means for sampling an output of said sensing means periodically and means for storing the last actual temperature of the heated roller previously sensed.

6. An apparatus according to claim 5, wherein said second deterioration means includes means to determine the sign, ascent or descent, of the temperature gradient of the heated roller from the last actual temperature previously sensed and an actual temperature of the heated roller presently sensed.

7. An apparatus according to claim 6, further comprising:
   a microcomputer programmed to determine the sign of the temperature state and the sign of temperature gradient, to control the heating means and to store the last actual temperature of the heated roller previously sensed in a memory.

* * * * *